(12) United States Patent
Iwami et al.

(10) Patent No.: US 9,613,533 B2
(45) Date of Patent: Apr. 4, 2017

(54) PARKING SPACE DETECTOR

(71) Applicant: HONDA MOTOR CO., LTD., Minato-ku, Tokyo (JP)

(72) Inventors: Hiroshi Iwami, Utsunomiya (JP); Satoko Yokochi, Utsunomiya (JP); Yuki Hara, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 51 days.

(21) Appl. No.: 14/650,652

(22) PCT Filed: Nov. 13, 2013

(86) PCT No.: PCT/JP2013/080620
§ 371 (c)(1),
(2) Date: Jun. 9, 2015

(87) PCT Pub. No.: WO2014/091858
PCT Pub. Date: Jun. 19, 2014

(65) Prior Publication Data
US 2016/0148514 A1   May 26, 2016

(30) Foreign Application Priority Data

Dec. 12, 2012 (JP) ................................. 2012-271157

(51) Int. Cl.
B60Q 1/48 (2006.01)
G08G 1/16 (2006.01)
(Continued)

(52) U.S. Cl.
CPC .............. G08G 1/168 (2013.01); B60W 30/06 (2013.01); G08G 1/14 (2013.01); G08G 1/065 (2013.01); G08G 1/141 (2013.01); G08G 1/147 (2013.01)

(58) Field of Classification Search
CPC ........... G08G 1/147; G08G 1/14; G08G 1/146
See application file for complete search history.

(56) References Cited

U.S. PATENT DOCUMENTS

| 4,556,873 A | * | 12/1985 | Yamada | G08B 17/10 250/574 |
| 5,764,142 A | * | 6/1998 | Anderson | G01D 3/032 340/506 |

(Continued)

FOREIGN PATENT DOCUMENTS

| HU | WO 2012107316 A1 * 8/2012 ............. G08G 1/168 |
| JP | 2009-078637 A    4/2009 |

(Continued)

OTHER PUBLICATIONS

Search Report and Office Action dated May 4, 2016 over the corresponding Chinese Patent Application No. 201380064615.4 with the English translation of pertinent portion.

(Continued)

*Primary Examiner* — Joseph Feild
*Assistant Examiner* — Rufus Point
(74) *Attorney, Agent, or Firm* — Carrier Blackman & Associates, P.C.; Joseph P. Carrier; William D. Blackman

(57) ABSTRACT

Provided is a parking space detector designed so as not to erroneously detect an inter-vehicle distance as a parking space, the inter-vehicle distance being the distance between oncoming vehicles continuously passing by. The invention is provided with a parking space presence determination part for determining whether or not a parking space for a vehicle is present. The parking space presence determination part is designed so as to determine whether or not oncoming vehicles are stationary on the basis of the vehicle speed and the relative speed of the oncoming vehicles, therefore preventing the space (inter-vehicle distance) between two other oncoming vehicles being erroneously detected as a parking space, the oncoming vehicles being vehicles traveling toward the vehicle and continuously passing by.

4 Claims, 10 Drawing Sheets

(51) Int. Cl.
*B60W 30/06* (2006.01)
*G08G 1/14* (2006.01)
*G08G 1/065* (2006.01)

(56) References Cited

U.S. PATENT DOCUMENTS

| | | | | |
|---|---|---|---|---|
| 5,945,799 A * | 8/1999 | Shimizu | B62D 15/0285 | 318/587 |
| 6,222,456 B1 * | 4/2001 | Tice | G08B 17/107 | 250/574 |
| 6,253,159 B1 * | 6/2001 | Bett | G05B 19/41875 | 702/159 |
| 6,339,373 B1 * | 1/2002 | Zeskind | G08B 29/04 | 340/10.1 |
| 6,624,750 B1 * | 9/2003 | Marman | G08B 25/003 | 340/4.3 |
| 6,816,085 B1 * | 11/2004 | Haynes | G08G 1/14 | 340/932.2 |
| 6,826,477 B2 * | 11/2004 | Ladetto | G01C 21/16 | 340/944 |
| 6,826,607 B1 * | 11/2004 | Gelvin | B60R 25/1004 | 340/539.19 |
| 6,967,582 B2 * | 11/2005 | Tice | G08B 17/10 | 340/522 |
| 7,075,424 B1 * | 7/2006 | Sundaresan | G01N 29/14 | 340/500 |
| 7,369,057 B2 * | 5/2008 | Twerdochlib | F01D 17/02 | 250/370.01 |
| 7,385,486 B2 * | 6/2008 | Danz | B60Q 9/006 | 340/435 |
| 7,489,136 B1 * | 2/2009 | Poland | G01R 31/2829 | 324/522 |
| 8,169,341 B2 * | 5/2012 | Toledo | B62D 15/028 | 340/932.2 |
| 8,232,872 B2 * | 7/2012 | Zeng | G06K 9/6293 | 340/425.5 |
| 8,503,943 B2 * | 8/2013 | Spanhake | H04Q 9/00 | 340/636.1 |
| 8,521,366 B2 * | 8/2013 | Schneider | B62D 15/0285 | 340/932.2 |
| 8,542,128 B2 * | 9/2013 | Kawabata | G08G 1/166 | 340/932.2 |
| 8,766,807 B2 * | 7/2014 | Gonzales | G08B 29/185 | 340/628 |
| 9,174,676 B2 * | 11/2015 | Jecker | B62D 15/0285 | |
| 2002/0163444 A1 * | 11/2002 | Budnovitch | G08G 1/14 | 340/932.2 |
| 2002/0175832 A1 * | 11/2002 | Mizusawa | G06T 11/00 | 340/932.2 |
| 2003/0105544 A1 * | 6/2003 | Kauffman | G05B 23/0224 | 700/109 |
| 2003/0200784 A1 * | 10/2003 | Smith, Jr. | G01D 3/028 | 73/1.01 |
| 2004/0249590 A1 * | 12/2004 | Ota | G01D 9/005 | 702/79 |
| 2005/0264099 A1 * | 12/2005 | Kamiya | B60T 7/22 | 303/15 |
| 2006/0136157 A1 * | 6/2006 | Sun | H03H 17/0294 | 702/75 |
| 2006/0143439 A1 * | 6/2006 | Arumugam | G06Q 10/08 | 713/153 |
| 2007/0063859 A1 * | 3/2007 | Twerdochlib | F01D 17/02 | 340/679 |
| 2008/0077294 A1 * | 3/2008 | Danz | B62D 15/028 | 701/41 |
| 2008/0146215 A1 * | 6/2008 | Oota | H04L 1/0017 | 455/422.1 |
| 2008/0211644 A1 * | 9/2008 | Buckley | B62D 15/027 | 340/435 |
| 2009/0121899 A1 * | 5/2009 | Kakinami | G06K 9/00805 | 340/932.2 |
| 2009/0303009 A1 * | 12/2009 | Itasaki | H04Q 9/00 | 340/10.1 |
| 2009/0303034 A1 * | 12/2009 | Abedi | G06Q 10/04 | 340/539.1 |
| 2010/0008286 A1 * | 1/2010 | Abedi | G01D 21/00 | 370/315 |
| 2010/0033122 A1 * | 2/2010 | Hartman | H02P 29/0241 | 318/490 |
| 2010/0085199 A1 * | 4/2010 | Gonzales | G08B 29/043 | 340/629 |
| 2010/0201508 A1 * | 8/2010 | Green | B60Q 9/008 | 340/435 |
| 2010/0271237 A1 * | 10/2010 | Reed | G01S 13/931 | 340/932.2 |
| 2010/0271238 A1 * | 10/2010 | Reed | G01S 13/931 | 340/932.2 |
| 2011/0140921 A1 * | 6/2011 | Pampus | B62D 15/027 | 340/932.2 |
| 2012/0197492 A1 * | 8/2012 | Schneider | B62D 15/0285 | 701/41 |
| 2013/0024103 A1 * | 1/2013 | Schneider | B60W 40/04 | 701/301 |
| 2014/0015693 A1 * | 1/2014 | Komoguchi | G08G 1/167 | 340/935 |
| 2014/0081476 A1 * | 3/2014 | Verdugo-Lara | G08G 1/168 | 701/1 |
| 2015/0022345 A1 * | 1/2015 | Matsuoka | G08B 25/002 | 340/527 |
| 2015/0151789 A1 * | 6/2015 | Lee | B62D 15/0285 | 701/41 |

FOREIGN PATENT DOCUMENTS

| | | |
|---|---|---|
| JP | 2009-107529 A | 5/2009 |
| WO | 2007/013489 A1 | 2/2007 |
| WO | 2011/091934 A1 | 8/2011 |
| WO | 2012107316 A1 | 8/2012 |
| WO | 2012136723 A1 | 10/2012 |

OTHER PUBLICATIONS

The English translation of the PCT/ISA/210 from PCT/JP2013/080620.

Office Action dated Nov. 24, 2015 issued over the corresponding Japanese National-Phase Application No. 2014-551937 with the English translation of pertinent portion.

* cited by examiner

PARKING SPACE DETECTOR

TECHNICAL FIELD

The present invention relates to a parking space detector (detecting device) for detecting a parking space by judging whether or not a parking space in which a driver's own vehicle can be parked exists on a road having parking spaces provided on a curbside thereof, for example.

BACKGROUND ART

Heretofore, as disclosed in Japanese Laid-Open Patent Publication No. 2009-107529 (hereinafter referred to as "JP2009-107529A"), a parking assist system has been proposed, which is mounted on a driver's own vehicle for detecting a parking space (see paragraphs [0007] and [0016] to [0019] of JP2009-107529A).

The vehicle in which the parking assist system is incorporated is configured such that, for example, a first distance sensor is arranged on a left front side of the vehicle, and a second distance sensor is arranged on a left rear side of the vehicle. Further, while an area in which adjacent vehicles are present is specified based on an output from the first distance sensor, the shape of a parking space is detected, a relative position and inclination of the detected parking space shape with respect to the driver's own vehicle is corrected based on output information from the second distance sensor, and the parking space is defined.

SUMMARY OF INVENTION

In the parking assist system according to the aforementioned conventional art, when a parking space is detected, and while the driver's own vehicle is traveling, depending on whether a space in which the driver's own vehicle can be parked exists between other vehicles that are parked before and behind one another in a parallel direction, a parking space is judged to be present in the case that such a space exists, whereas a parking space is judged not to be present in the case that such a space does not exist.

However, with the parking space detecting method carried out by the parking assist system according to the above-described conventional art, in a case where a driver's own vehicle is traveling, for example, inside of a parking lot while searching for a parking space, there is a problem in that an inter-vehicular distance, which occurs between two other vehicles (oncoming vehicles) that are traveling toward and continuously pass by the driver's own vehicle, may be erroneously detected as being a parking space.

In this regard, to facilitate understanding of the present invention, techniques according to comparative examples, on which the present invention is premised, will be described.

As shown in FIG. 6, for example, with a system for detecting a parking space for parallel parked vehicles, ultrasonic sensors 104, 106, which have ultrasonic detecting ranges 100, 102 as shown by the dot-rendered regions, are mounted on the left and right of a front bumper of a driver's own vehicle 108.

In addition, as shown in FIG. 7, at a time that other vehicles are present as parked vehicles 110, 112 on the left and right of a road 114, the driver's own vehicle 108 is driven (i.e., travels) in the direction of the arrow while the ultrasonic sensors 104, 106 are operated, whereby a parking space 116 between the parked vehicles 110 and a parking space 118 between the parked vehicles 112 can be detected, wherein the parking spaces 116, 118 are defined by a predetermined interval within which the parked vehicles 110, 112 are not detected, as shown by the regions that are rendered in cross-hatching.

Further, as shown in FIG. 8, with a system for detecting a parking space in which a vehicle is to be backed, ultrasonic sensors 124, 126, which have ultrasonic detecting ranges 120, 122, are mounted on the left and right of a rear bumper of a driver's own vehicle 128.

In addition, as shown in FIG. 9, when the driver's own vehicle 128 enters from the rear into a parking space 130 that exists between two parked vehicles 132, while a distance between both of the parked vehicles 132, which are on the left and right of the driver's own vehicle 128, is measured by the ultrasonic sensors 124, 126, the driver's own vehicle 128 is parked in parallel centrally between both of the parked vehicles 132.

Furthermore, as shown in FIG. 10, on a one-way traffic route 140 having only one lane in a commercial area, for example, the driver's own vehicle 108 travels while the left and right ultrasonic sensors 104, 106 are operated, and normal detection of parking spaces on the curbsides is carried out. As a result, all of the parking spaces may be occupied by parked vehicles 112, that is, a parking space may not exist, and then the driver's own vehicle 108 may enter in a rightward direction shown by the arrow, with the same state as on the one-way traffic route, and may travel along a general two-lane road 142 having one lane each way. Such a case will be considered below.

In this case, oncoming vehicles 136 that pass by the driver's own vehicle are mistakenly detected as parked vehicles 132, and as a result, an event occurs in which a space 134, which is rendered by the region shown in hatching, i.e., the inter-vehicular distance between front and rear oncoming vehicles 136 that continuously pass by the driver's own vehicle, is determined in error (mistakenly detected) to be a parking space. Consequently, the driver is given false information.

The present invention has been devised taking into consideration the aforementioned problem, and has the object of providing a parking space detecting device, which is capable of detecting a (true) parking space, by properly determining whether or not a space in front of or behind an object that the running driver's own vehicle passes by is a parking space (i.e., a region in which parking is possible).

A parking space detecting device according to the present invention includes a parking space existence determiner configured to determine whether or not a parking space for a driver's own vehicle exists. The parking space existence determiner judges whether or not an object that the traveling driver's own vehicle passes by, is a stationary object. Further, if the object is judged to be stationary, the parking space existence determiner determines that there is a possibility for the parking space to exist in at least one of front and rear of the object.

According to the present invention, the parking space existence determiner judges whether or not an object that the traveling driver's own vehicle passes by, is a stationary object, and if the passing object is judged to be stationary, the parking space existence determiner determines that there is a possibility for the parking space to exist in at least one of front and rear of the object. Therefore, a determination (erroneous determination), in which a space in front of or behind a moving and passing object, e.g., another traveling vehicle, or an inter-vehicular distance between oncoming vehicles that are continuously traveling toward the driver's own vehicle, is mistakenly detected as a parking space can be avoided. Consequently, it can unerringly be determined whether or not a space in front of or behind an object that the traveling driver's own vehicle passes by is a parking space.

In this case, for judging whether or not an object that the traveling driver's own vehicle passes by, is a stationary object, the parking space detecting device may further include a relative velocity detector that detects a relative velocity of the object that the traveling driver's own vehicle passes by, whereby the parking space existence determiner is capable of easily judging whether or not the object is stationary, based on the relative velocity that is detected by the relative velocity detector, and a driver's own vehicle velocity, which is a velocity at which the driver's own vehicle is traveling.

The driver's own vehicle velocity may be either one of a velocity that is detected by a driver's own vehicle velocity sensor incorporated in the driver's own vehicle, and a prescribed velocity at a time that the driver's own vehicle is traveling at the prescribed velocity by way of automated traveling or the like.

By configuring the relative velocity detector to include a first object detecting sensor and a second object detecting sensor, which are disposed with an interval therebetween having a predetermined distance in a longitudinal direction of at least one side of the driver's own vehicle, the relative velocity can be obtained based on the predetermined distance and a time difference from a time at which the object is detected by the first object detecting sensor until a time at which the object is detected by the second object detecting sensor.

The relative velocity detector may include at least one of a radar system, a sonar system, and a camera that is disposed on the driver's own vehicle. By respectively providing such features, such as the radar system or the like, the amount of relative movement per unit time, or stated otherwise, the relative velocity of the object can be detected.

According to the present invention, it is judged whether or not an object that the traveling driver's own vehicle passes by, is a stationary object, and if the object is judged to be stationary, it is determined that there is a possibility for the parking space to exist in at least one of front and rear of the object. Therefore, a space in front of or behind another vehicle that is traveling, e.g., in a parking lot while searching for a parking capable area, or an oncoming vehicle that is traveling on a road, is not detected mistakenly as a parking space. Further, mistaken detection of an interval (inter-vehicular distance), which exists between two other passing vehicles that are continuously traveling toward the traveling driver's own vehicle, as a parking space can be avoided.

According to the present invention, it can unerringly be determined whether or not a space in front of or behind an object that the traveling driver's own vehicle passes by is a parking space.

DESCRIPTION OF EMBODIMENTS

Below, an embodiment of the present invention will be described with reference to the drawings.

Figure 1:
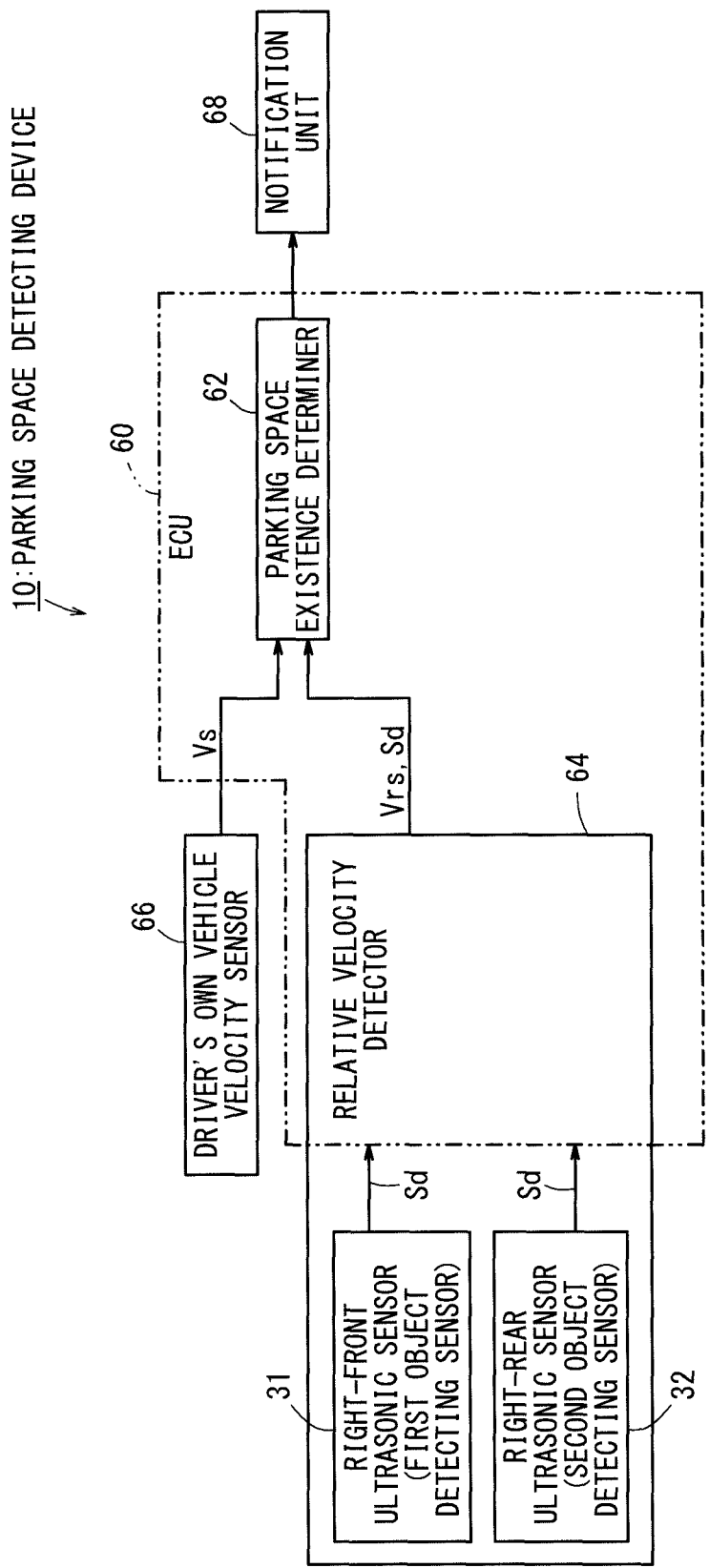
FIG. 1 is a block diagram of a parking space detecting device according to an embodiment of the present invention.
Figure 2:
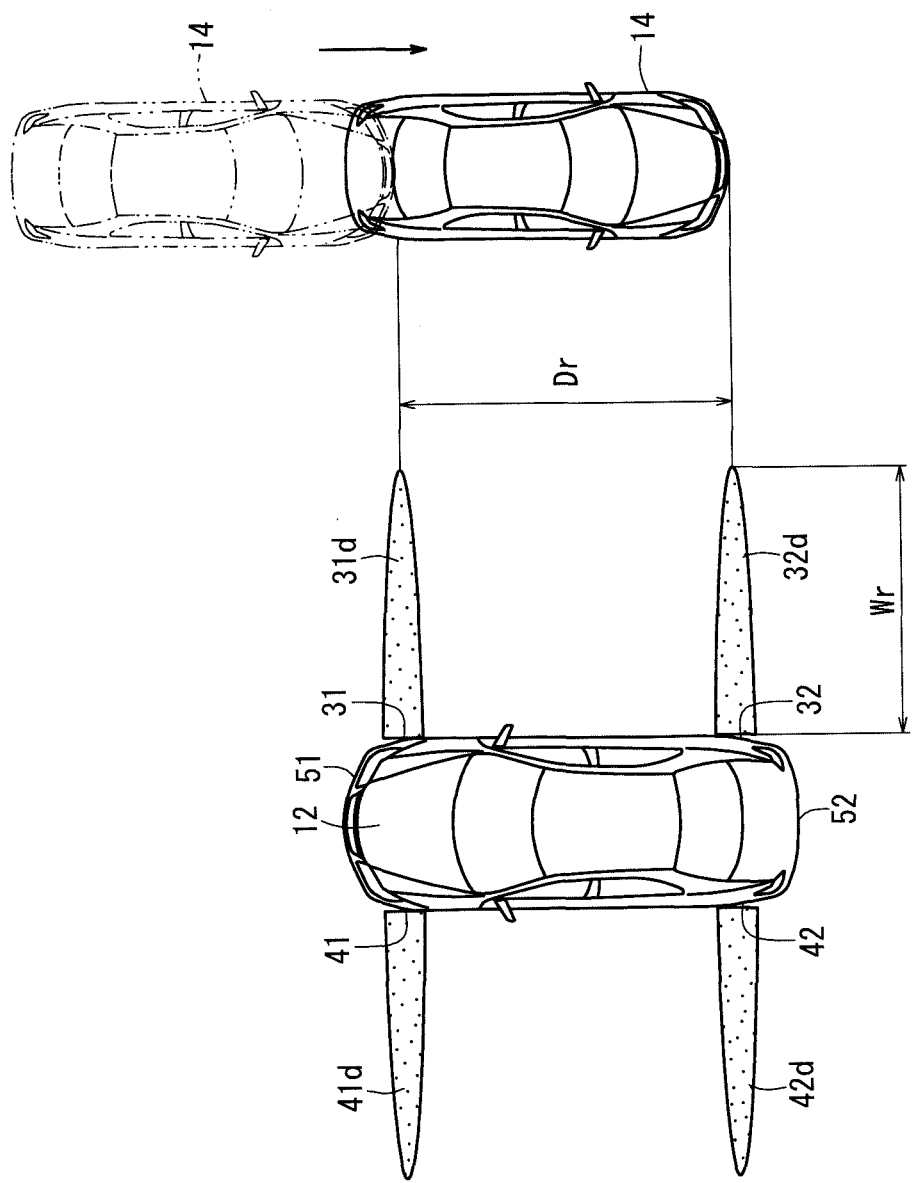
FIG. 2 is a plan view schematically showing a relationship between another vehicle and a driver's own vehicle in which the parking space detecting device shown in FIG. 1 is incorporated.

FIG. 1 is a block diagram of a parking space detecting device 10 according to the embodiment of the present invention, and FIG. 2 is a plan view schematically showing a relationship between another vehicle 14 and a driver's own vehicle 12 in which the parking space detecting device 10 shown in FIG. 1 is incorporated.

As understood from FIG. 2, in the driver's own vehicle 12, there are incorporated a right-front ultrasonic sensor 31, a right-rear ultrasonic sensor 32, a left-front ultrasonic sensor 41, and a left-rear ultrasonic sensor 42. The left-front ultrasonic sensor 41 and the right-front ultrasonic sensor 31 are arranged on left and right sides (opposite side portions) of a front bumper 51, and the left-rear ultrasonic sensor 42 and the right-rear ultrasonic sensor 32 are arranged on left and right sides (opposite side portions) of a rear bumper 52.

Each of the ultrasonic sensors 31, 32, 41, 42 has a detection range 31$d$, 32$d$, 41$d$, 42$d$ of ultrasonic wave, as shown by the dot-rendered regions. An object detection distance Wr of the detection range 31$d$, 32$d$, 41$d$, 42$d$ in a lateral direction of the vehicle is set to a distance at which later-described parked vehicles and other vehicles 14 by which the driver's own vehicle 12 passes can be detected. Each of the ultrasonic sensors 31, 32, 41, 42 outputs object detection signal Sd (see FIG. 1), if it is detected that an object is present inside of the corresponding detection range 31$d$, 32$d$, 41$d$, 42$d$.

The placement interval between the right-front ultrasonic sensor 31 and the right-rear ultrasonic sensor 32, and the placement interval between the left-front ultrasonic sensor 41 and the left-rear ultrasonic sensor 42 are set to a known predetermined distance Dr.

As shown in FIG. 1, the parking space detecting device 10 includes an ECU (Electronic Control Unit) 60 that functions as a control device.

In addition to a CPU (Central Processing Unit), a ROM (also including an EEPROM) that serves as a memory, and a RAM (Random Access Memory), the ECU 60 also includes input/output devices such as an A/D converter, a D/A converter or the like, and a timer, etc., that serves as a clock unit. By reading out and executing programs that are stored in the ROM, the CPU functions as various function realizing sections (function realizing means), for example, a control unit, an arithmetic unit, and a processing unit or the like.

In the present embodiment, the ECU 60 functions as portions of a parking space existence determiner 62 and a relative velocity detector 64. Such functions may also be realized by hardware components.

As shown in FIG. 1, the parking space existence determiner 62 in the parking space detecting device 10 according to the present embodiment includes a function for judging whether or not objects, e.g., other vehicles 14, that pass on the right side of the road in the direction of travel of the driver's own vehicle 12 in so-called left-hand side road traffic, are stationary. For this purpose, the relative velocity detector 64 includes as constituent components thereof the right-front ultrasonic sensor 31 as a first object detecting sensor, and the right-rear ultrasonic sensor 32 as a second object detecting sensor. Moreover, in a case where the parking space existence determiner 62 judges whether or not objects, e.g., other vehicles, which pass on the left side of the road in the direction of travel of the driver's own vehicle 12 in so-called right-hand side road traffic, are stationary, the relative velocity detector 64 may include as constituent components thereof the left-front ultrasonic sensor 41 as a first object detecting sensor, and the left-rear ultrasonic sensor 42 as a second object detecting sensor.

A driver's own vehicle velocity Vs, which is detected by a driver's own vehicle velocity sensor 66, and a relative velocity Vrs of the other vehicles 14, which is detected by a relative velocity detector 64, are extracted by the parking space existence determiner 62.

The parking space existence determiner 62 judges whether or not other vehicles 14 are stationary based on the driver's own vehicle velocity Vs and the relative velocity Vrs, and further determines the existence (presence or absence) of a parking space from the interval between the other vehicles 14 that are stationary.

In this case, when a parking space is determined to exist, the parking space existence determiner 62 outputs a notification (via a display or a voice output, etc.) to thereby notify the user (driver, etc.) of the parking space detecting device 10 that a parking space exists, through a notification unit 68, which is equipped with a display (display unit) or a speaker (voice output unit) or the like.

Figure 3:
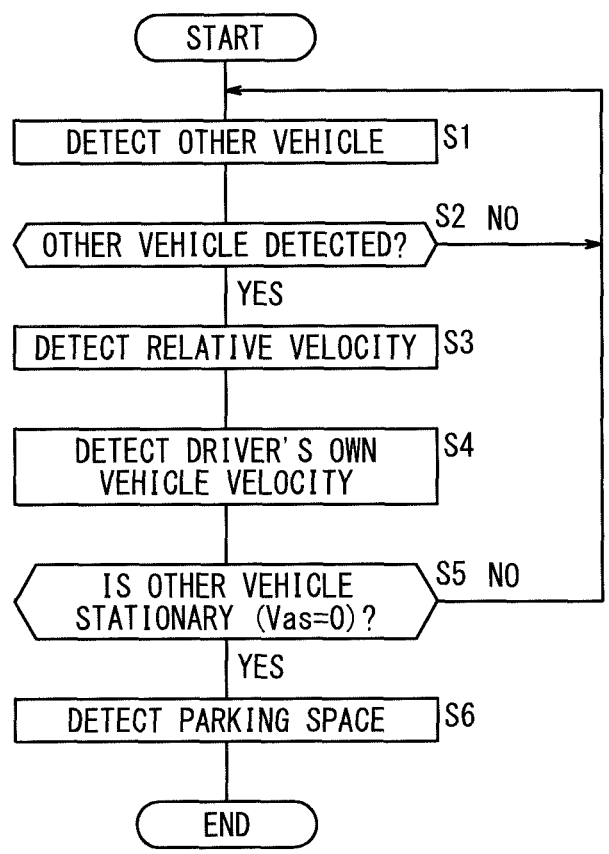
FIG. 3 is a flowchart for providing a description of operations of the parking space detecting device according to the present embodiment.

The parking space detecting device 10 according to the present embodiment is constructed basically as described above. Next, operations of the parking space detecting device 10 will be described with reference to the flowchart of FIG. 3.

In the driver's own vehicle 12 during traveling thereof, i.e., at a time that the driver's own vehicle 12 is traveling or is being driven, when it is detected by the ECU 60 that a non-illustrated parking-space detection switch has been operated, then in step S1, the parking space existence determiner 62 activates the respective ultrasonic sensors 31, 32, 41, 42 of the driver's own vehicle 12 during traveling, and carries out a process to detect objects such as other vehicles 14 or the like that are present within the detection ranges 31d, 32d, 41d, 42d.

In step S2, the parking space existence determiner 62 determines whether or not an object such as another vehicle 14 or the like has been detected, based on whether object detection signals Sd have been sent, respectively, from the ultrasonic sensors 31, 32, 41, 42. Moreover, the object detection signals Sd from the respective ultrasonic sensors 31, 32, 41, 42 also are sent to the relative velocity detector 64.

If any object detection signal Sd is sent (when an object has been detected; step S2: YES), then in step S3, the relative velocity detector 64 detects (calculates) the relative velocity Vrs of the object such as a passing other vehicle 14 or the like.

In this case, as will be explained with reference to FIG. 2, the relative velocity Vrs is calculated as Vrs=Dr/ΔS, based on a time difference ΔS between a time at which the vehicle front end of the other vehicle 14 is detected by the right-front ultrasonic sensor 31, and a time at which the vehicle front end of the other vehicle 14 is thereafter detected by the right-rear ultrasonic sensor 32, and the predetermined distance Dr, i.e., the placement interval, between the right-front ultrasonic sensor 31 and the right-rear ultrasonic sensor 32.

Next, in step S4, using the driver's own vehicle velocity sensor 66, the parking space existence determiner 62 detects the current driver's own vehicle velocity Vs. In the event that the driver's own vehicle 12 is a vehicle capable of being driven automatically, having an automated accelerator function and an automated braking function, the driver's own vehicle velocity Vs may be a prescribed velocity at the time that the driver's own vehicle 12 is traveling at the prescribed velocity.

Next, in step S5, the parking space existence determiner 62, which also functions as a stationary judgment determiner in relation to passing objects, calculates the other vehicle velocity Vas, which is an absolute velocity calculated by subtracting the driver's own vehicle velocity Vs detected by the driver's own vehicle velocity sensor 66 from the relative velocity Vrs detected by the relative velocity detector 64. If the other vehicle velocity Vas is not a zero value (Vas≠0) (small errors therefrom may also be expected and taken into consideration), then it is judged that the other vehicle 14 as a passing object is an oncoming vehicle that is currently traveling (step S5: NO), whereupon the process returns to step S1. If the other vehicle velocity Vas is a zero value (Vas=0), then it is judged that the other vehicle 14 as a passing object is stationary (step S5: YES).

Figure 7:
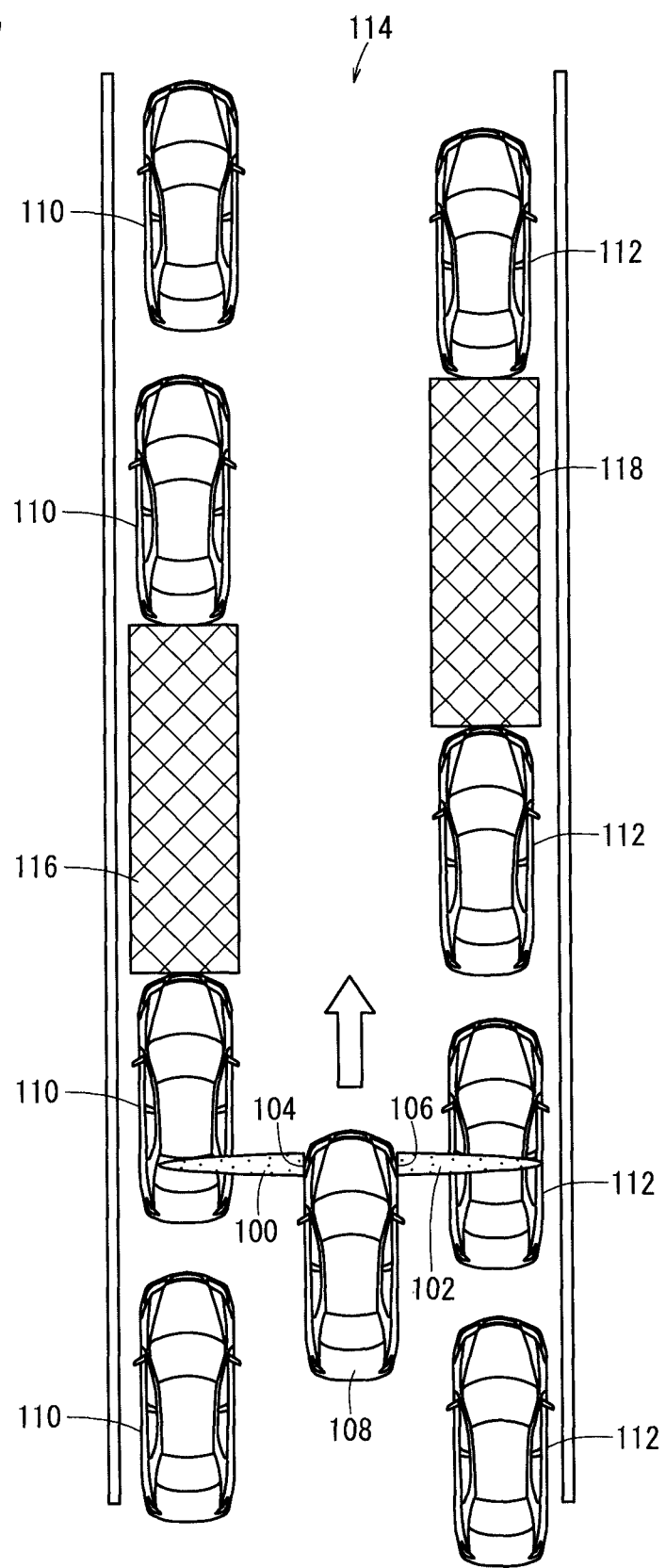
FIG. 7 is an explanatory diagram of operations performed by the vehicle of the example of FIG. 6, which is looking for a parking space between parked vehicles that are parked on left and right sides of a road.
Figure 8:
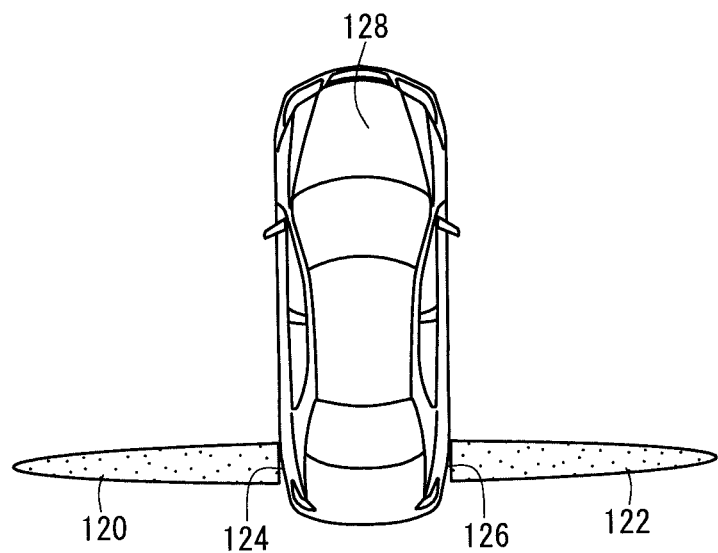
FIG. 8 is a schematic plan view of a vehicle according to a comparative example, in which ultrasonic sensors are mounted on left and right sides of a rear bumper of a driver's own vehicle.
Figure 9:
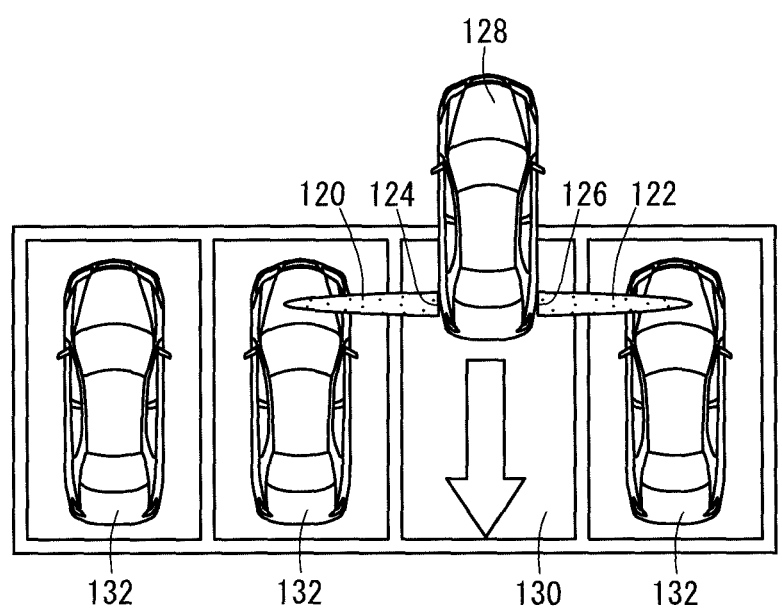
FIG. 9 is an explanatory diagram of operations performed by the vehicle of the example of FIG. 8, which is parked from the rear in a space between parked vehicles.
Figure 10:
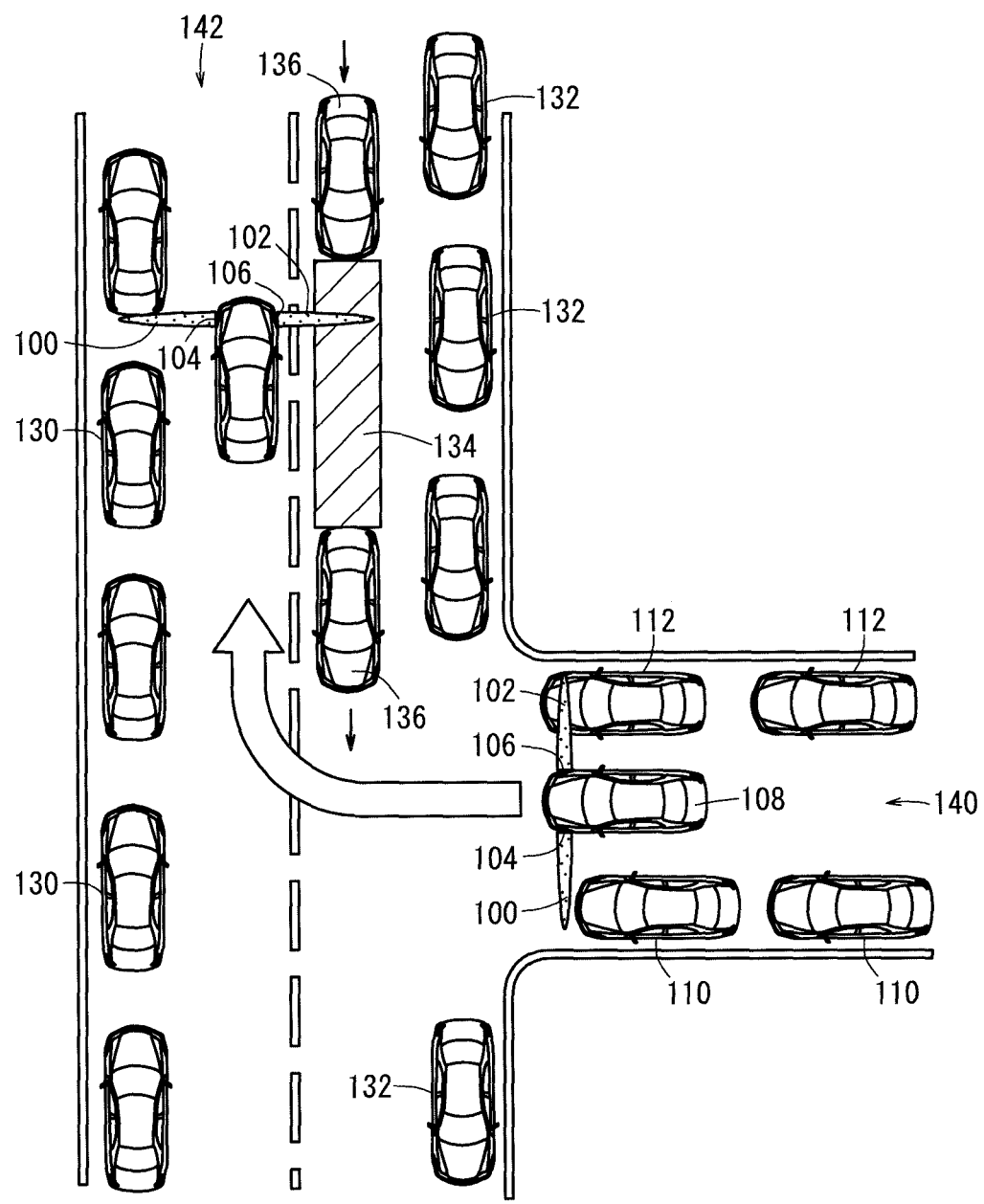
FIG. 10 is a schematic plan view for describing an event of the vehicle of the example of FIG. 6 in which an inter-vehicular distance between oncoming vehicles is mistakenly detected as a parking space.

If the other vehicle 14 is judged to be stationary, then in step S6, the normal parking space detection process, an example of which was described above with reference to FIG. 7, is carried out.

Figure 4:
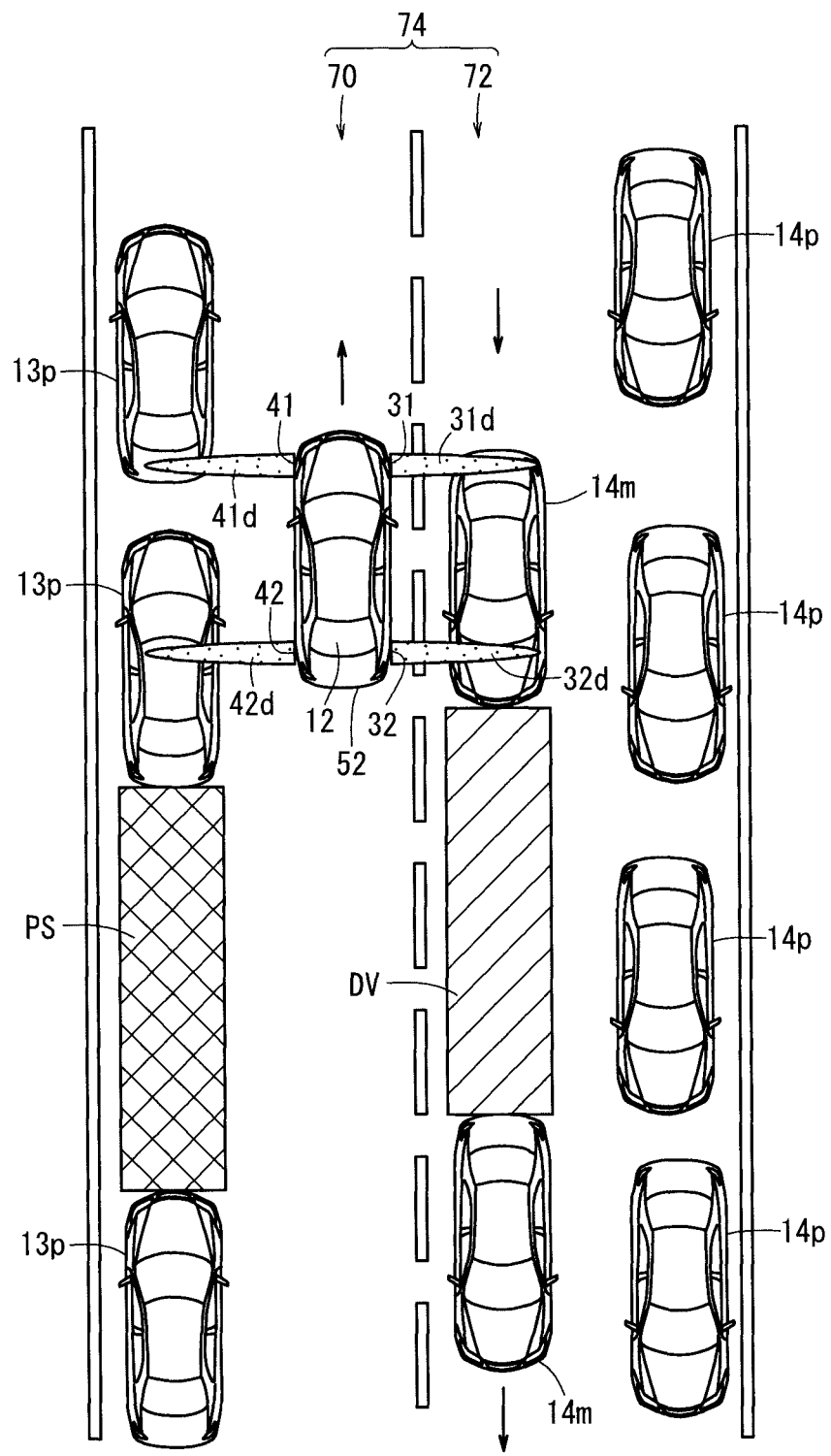
FIG. 4 is a schematic plan view for describing operations of the parking space detecting device according to the present embodiment.

In this regard, as shown by the schematic plan view of FIG. 4, in the case that parked vehicles 14p, which are parked in an oncoming lane 72, and other parked vehicles 13p, which are parked in a traveling lane 70, are present on a road 74 having the traveling lane 70 and the oncoming lane 72, each lane having parking areas, and further wherein oncoming vehicles 14m are present that are traveling in the oncoming lane 72, a situation may be considered in which the driver's own vehicle 12 is traveling forward in the traveling lane 70 in the direction of the arrow.

In this case, through operation of the above-described parking space detecting device 10, the space indicated by the range that is rendered by hatching is determined to be an inter-vehicular distance DV between oncoming vehicles 14m, 14m that are traveling one behind the other, whereas the space indicated by the range that is rendered in crosshatching between the parked vehicles 13p, 13p can be determined to be a parking space PS in which the driver's own vehicle can be parked. Accordingly, mistaken detection of the inter-vehicular distance DV between the oncoming vehicles 14*m* that are traveling one behind the other and continuously pass by the driver's own vehicle as being a parking space is avoided.

Further, although in the aforementioned embodiment the relative velocity detector 64 is configured to include, as the constituent elements, two ultrasonic sensors, i.e., the right-front ultrasonic sensor 31 as a first object detecting sensor and the right-rear ultrasonic sensor 32 as a second object detecting sensor, the present invention is not limited to this feature. Alternatively, as shown in FIG. 5, a configuration can be substituted, having a parking space detecting device 10A in which one relative velocity detector 64A is arranged, for example, in a center of the front bumper 51 or a center of a front grill of the driver's own vehicle 12A.

Figure 5:
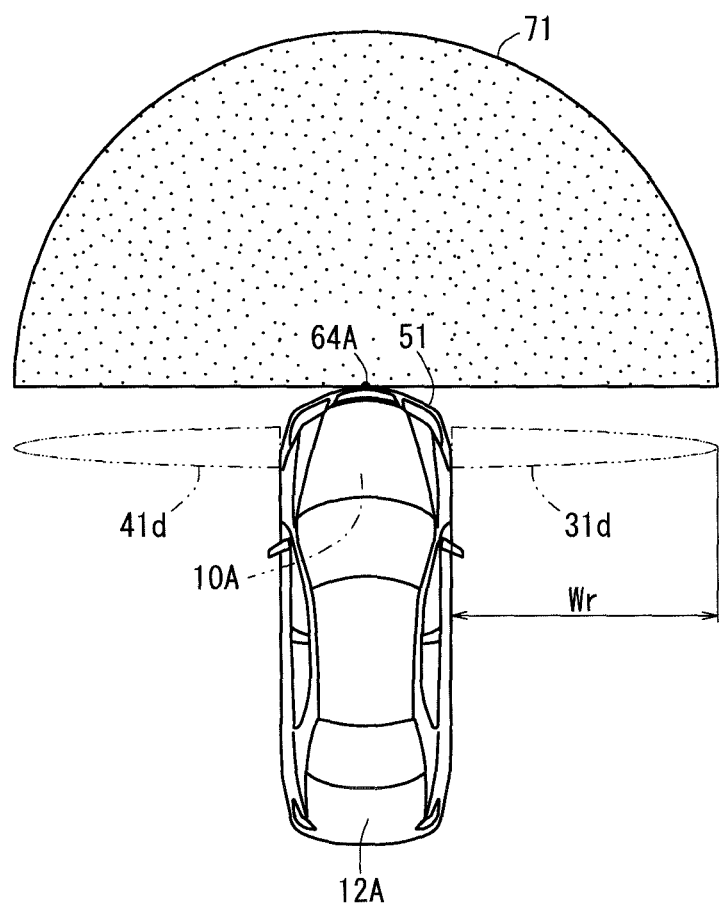
FIG. 5 is a schematic plan view showing another exemplary configuration of a relative velocity detector.
Figure 6:
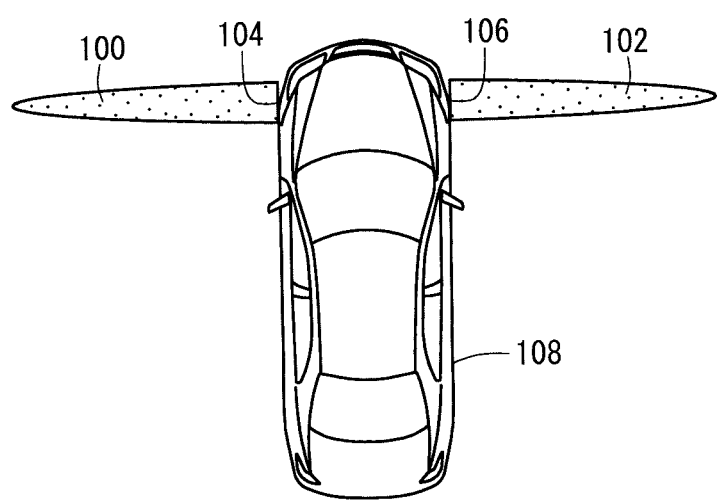
FIG. 6 is a schematic plan view of a vehicle according to a comparative example, in which ultrasonic sensors are mounted on left and right sides of a front bumper of a driver's own vehicle.

In the parking space detecting device 10A according to the example shown in FIG. 5, a detection range 71 of the relative velocity detector 64A, which is indicated by the dot-rendered region, is a range formed within a detection radius in front of the driver's own vehicle 12A, the detection radius being defined by a distance obtained by adding a half-length of the vehicle width of the driver's own vehicle 12A to the above-described object detection distance Wr.

As the relative velocity detector 64A of the example shown in FIG. 5, there can be put to use any of various well known systems, such as a radar (e.g., scanning radar) system, a sonar (e.g., scanning sonar) system, or a camera (e.g., a video camera equipped with a super-wide angle lens), and the relative velocity detector 64A can detect (calculate) the relative velocity Vrs of objects that are captured within the detection range 71.

SUMMARY OF EMBODIMENT

As shown in FIGS. 1 through 4, the parking space detecting device 10 according to the above-described embodiment is equipped with the parking space existence determiner 62 for determining whether or not a parking space PS for a driver's own vehicle 12 exists. The parking space existence determiner 62 judges whether or not an object (any one of parked vehicles 13*p*, 14*p*, other vehicles 14, or oncoming vehicles 14*m*) that the traveling driver's own vehicle 12 passes by, is stationary, and if the object is judged to be stationary, determines that there is a possibility for the parking space PS to exist in at least one of front and rear of the object.

Therefore, a determination (erroneous determination), in which a space in front of or behind a moving and passing object (e.g., another traveling vehicle (oncoming vehicles 14*m* or parallel traveling vehicles)), or an inter-vehicular distance DV between oncoming vehicles 14*m* that are continuously traveling toward the driver's own vehicle 12, is determined as a parking space PS, can be avoided. Consequently, it can reliably be determined whether or not a space in front of or behind an object that the traveling driver's own vehicle 12 passes by is a parking space PS.

In this case, for judging whether or not an object that the moving driver's own vehicle 12 passes by, is stationary, by further providing the relative velocity detector 64 that detects a relative velocity Vrs of the object that the running driver's own vehicle 12 passes by, the parking space existence determiner 62 is capable of easily judging whether or not the object is stationary, based on the relative velocity Vrs that is detected by the relative velocity detector 64, and the driver's own vehicle velocity Vs, which is the velocity at which the driver's own vehicle 12 is traveling.

The driver's own vehicle velocity Vs may be either one of a velocity that is detected by the driver's own vehicle velocity sensor 66, which is incorporated in the driver's own vehicle 12, or a prescribed velocity at a time that the driver's own vehicle 12 is traveling at the prescribed velocity by way of automatic traveling or the like.

Further, the relative velocity detector 64 includes the right-front ultrasonic sensor 31 as a first object detecting sensor, and the right-rear ultrasonic sensor 32 as a second object detecting sensor, which are disposed with an interval therebetween having a predetermined distance Dr in a longitudinal direction of at least one side (a right side portion or a left side portion) of the driver's own vehicle 12. The relative velocity Vrs of the oncoming vehicle 14*m* is calculated as Vrs=Dr/ΔS, based on the predetermined distance Dr and the time difference ΔS from a time at which the object (e.g., the vehicle front end of the oncoming vehicle 14*m* on the upper side of FIG. 4) is detected by the right-front ultrasonic sensor 31 until a time at which the same portion (the vehicle front end of the oncoming vehicle 14*m* on the upper side of FIG. 4) of the object is detected by the right-rear ultrasonic sensor 32. The time difference ΔS can be measured or counted by a timer (clock unit) in the ECU 60.

Furthermore, as described with reference to FIG. 5, the relative velocity detector 64A may include at least one of a radar system, a sonar system, and a camera that is disposed on the driver's own vehicle 12A. Consequently, during traveling of the driver's own vehicle 12A, the relative velocity Vrs of the object can be detected within the detection range 71 of the radar system or the like.

According to the present invention, in a case where a driver's own vehicle 12, 12A is traveling while searching for a parking space PS, it is judged whether or not an object (a parked vehicle 13*p*, an oncoming vehicle 14*m*, etc.) that the traveling driver's own vehicle 12, 12A passes by, is a stationary object. In addition, if the passing object is judged to be stationary, it is possible to determine that there is a possibility for the parking space PS to exist in at least one of front and rear of the object (in this case, the parked vehicle 13*p*). Therefore, a space in front of or behind another vehicle 14 that is traveling in a parking lot while searching for a parking capable area, for example, and a space in front of or behind an oncoming vehicle 14*m* that is traveling on the road 74, are not detected mistakenly as a parking space PS. Further, mistaken detection of an interval (inter-vehicular distance DV) between oncoming vehicles 14*m*, which are two other passing vehicles that are continuously traveling toward the traveling driver's own vehicle 12, 12A, as a parking space PS can be avoided.

The present invention is not limited to the above embodiments, but various arrangements may be adopted based on the descriptive content of the present disclosure.

The invention claimed is:

1. A parking space detecting device comprising:
  a parking space existence determiner configured to determine whether or not a parking space for a driver's own vehicle exists; and
  a relative velocity detector configured to detect a relative velocity of an object that the driver's own vehicle passes by when the driver's own vehicle is traveling,
  wherein the parking space existence determiner judges whether or not the object that the traveling driver's own vehicle passes by, is a stationary object, and if the object is judged to be stationary, the parking space existence determiner determines that there is a possibility for the parking space to exist in at least one of front and rear of the object that is judged to be stationary, whereas if the object is judged to be moving, the parking space existence determiner determines that there is no possibility for the parking space to exist in front or rear of the object that is judged to be moving, and wherein the parking space existence determiner judges whether or not the passing object is stationary, based on the relative velocity that is detected by the relative velocity detector, and a driver's own vehicle velocity which is a velocity at which the driver's own vehicle is traveling.

2. The parking space detecting device according to claim 1, wherein the driver's own vehicle velocity is either one of a velocity that is detected by a driver's own vehicle velocity sensor incorporated in the driver's own vehicle, and a prescribed velocity at a time that the driver's own vehicle is traveling at the prescribed velocity.

3. The parking space detecting device according to claim 1, wherein:

the relative velocity detector includes a first object detecting sensor and a second object detecting sensor, which are disposed with an interval therebetween having a predetermined distance in a longitudinal direction of at least one side of the driver's own vehicle; and the relative velocity is obtained based on the predetermined distance and a time difference from a time at which the object is detected by the first object detecting sensor until a time at which the object is detected by the second object detecting sensor.

4. The parking space detecting device according to claim 1, wherein the relative velocity detector includes at least one of a radar system, a sonar system, and a camera that is disposed on the driver's own vehicle.

\* \* \* \* \*